US010874236B1

(12) United States Patent
Allen (10) Patent No.: US 10,874,236 B1
(45) Date of Patent: Dec. 29, 2020

(54) SELF-LOCKING CUP HOLDER (71) Applicant: Research & Design Innovations, LLC, Branford, CT (US)

(72) Inventor: Donald Terry Allen, Madison, CT (US)

(73) Assignee: Research & Design Innovations, LLC, Branford, CT (US)

( * ) Notice: Subject to any disclaimer, the term of this patent is extended or adjusted under 35 U.S.C. 154(b) by 130 days.

(21) Appl. No.: 16/155,541

(22) Filed: Oct. 9, 2018

Related U.S. Application Data (60) Provisional application No. 62/569,283, filed on Oct. 6, 2017.

(51) Int. Cl.
*A47G 23/02* (2006.01)

(52) U.S. Cl.
CPC ................ *A47G 23/0216* (2013.01)

(58) Field of Classification Search
CPC ........ B60N 3/103; B60N 3/026; B60N 3/106; A47K 1/09; A47G 23/0216; A47G 23/0225
USPC ....................................................... 220/737
See application file for complete search history.

(56) References Cited

U.S. PATENT DOCUMENTS

| 5,390,887 A * | 2/1995 | Campbell | B60N 3/103 224/42.32 |
| 5,655,742 A * | 8/1997 | Whitman | B60N 3/103 248/311.2 |
| 6,705,580 B1 * | 3/2004 | Bain | B60N 3/106 248/311.2 |
| 6,843,397 B2 * | 1/2005 | Then | B60N 2/0224 224/552 |
| 7,748,678 B2 * | 7/2010 | Camarota | B60N 3/101 248/311.2 |
| 7,954,773 B2 * | 6/2011 | Carnevali | B60N 3/103 248/160 |

* cited by examiner

*Primary Examiner* — Jeffrey R Allen
(74) *Attorney, Agent, or Firm* — DeLio Peterson & Curcio LLC; Thomas E. Ciesco (57) ABSTRACT

A self-locking cup holder securable in an opening in a surface comprising an outer sleeve having a cylindrical wall, a plurality of horizontally elongated openings, each elongated opening extending around an upper portion of the outer sleeve cylindrical wall, a cylindrical rim disposed above the elongated openings and a plurality of support members extending horizontally between the elongated openings and extending vertically between the cylindrical wall and the cylindrical rim. The self-locking cup holder includes a locking ring having a cylindrical ring wall rotatingly engaging the outer sleeve on an outer surface of the outer sleeve adjacent the elongated openings and support members, and a plurality of hinged horizontal flaps disposable in the elongated openings. The hinged flaps have a larger thickness at a second end tapering to a smaller thickness at a first flap end attached to the locking ring cylindrical wall.

18 Claims, 7 Drawing Sheets

SELF-LOCKING CUP HOLDER

BACKGROUND OF THE INVENTION

1. Field of the Invention

The present invention relates generally to cup holders which may be secured in a cup holder opening without the use of fasteners or tools.

2. Description of Related Art

Companies manufacture boating accessories having cup holders that may be mounted on the boat as delivered to the customer or may be provided as optional add-ons or aftermarket items.

SUMMARY OF THE INVENTION

Bearing in mind the problems and deficiencies of the prior art, it is therefore an object of the present invention to provide a cup holder which locks into a surface opening without the use of tools.

It is another object of the present invention to provide a self-locking cup holder which is secure when installed in a surface opening.

A further object of the invention is to provide a self-locking cup holder which may be quickly installed in a surface opening.

It is yet another object of the present invention to provide a method for installing a self-locking cup holder.

Still other objects and advantages of the invention will in part be obvious and will in part be apparent from the specification.

The above and other objects, which will be apparent to those skilled in the art, are achieved in the present invention which is directed to a self-locking cup holder securable in an opening in a surface comprising an outer sleeve having a cylindrical wall, a plurality of horizontally elongated openings, each elongated opening extending around an upper portion of the outer sleeve cylindrical wall, a cylindrical rim disposed above the elongated openings and a plurality of support members extending horizontally between the elongated openings and extending vertically between the cylindrical wall and the cylindrical rim. The self-locking cup holder includes a locking ring having a cylindrical ring wall rotatingly engaging the outer sleeve on an outer surface of the outer sleeve adjacent the elongated openings and support members, and a plurality of hinged horizontal flaps disposable in the elongated openings. The hinged flaps have a larger thickness at a second end tapering to a smaller thickness at a first flap end attached to the locking ring cylindrical wall, the hinged flaps movable from a first inward position to a second outward position. Rotation of the outer sleeve in relation to the locking ring urges the plurality of support members toward the thicker end of the hinged flaps, forcing the hinged flaps from the first position to the second position against the surface opening when the cup holder is disposed in the opening, securing the cup holder in the opening. The self-locking cup holder may include a cup holder insert having an insert cylindrical wall and a flange extending outwardly from an upper rim of the cup holder insert, the cup holder insert engagable with the outer sleeve. The cup holder outer sleeve may include an outer sleeve flange extending radially outward from the outer sleeve cylindrical rim and the insert flange is engagable over the outer sleeve flange.

Another aspect of the invention is directed to a self-locking cup holder securable in an opening in a surface comprising an outer sleeve having a cylindrical wall and a plurality of horizontally elongated openings, each elongated opening extending around an upper portion of the outer sleeve cylindrical wall. The outer sleeve includes a plurality of support members disposed between the elongated opening. The self-locking cup holder includes a locking ring having a cylindrical wall and a plurality of hinged horizontal flaps disposable in the elongated openings. The hinged flaps have a larger thickness at a second end tapering to a smaller thickness at a first flap end attached to the locking ring cylindrical wall. The locking ring is rotatingly engagable on an exterior upper portion of the outer sleeve and the hinged flaps are movable from a first position toward the cup holder insert to a second position adjacent the surface opening. Rotation of the outer sleeve in relation to the locking ring urges the plurality of members toward the thicker end of the hinged flaps, forcing the hinged flaps outwardly against the surface opening when the cup holder is disposed in the opening and secures the cup holder in the opening. The cup holder insert may have an insert cylindrical wall and a flange extending outwardly from an upper rim of the cup holder insert, the cup holder insert engagable with the outer sleeve. The cup holder insert may include a trim ring engagable with the outer sleeve flange. The cup holder insert may include a plurality of elongated holder protrusions extending radially outward from the outside surface of the cup holder insert cylindrical wall and the outer sleeve may include a plurality of elongated sleeve protrusions extending radially inward from the inside surface of the outer sleeve engagable with the elongated holder protrusions wherein rotation of the outer sleeve forces the support members to slide against the corresponding hinged flap toward the thicker end of the hinged flap urging the thicker end against the surface opening until a plurality of vertical ridges disposed on the hinged flap are plastically deformed against the surface opening, securing the cup holder in the opening. The self-locking cup holder may include an integrated electrical connector for powering electrical devices within or adjacent the cup holder insert. The flaps may include outwardly extending protrusions for engaging the surface opening when the cup holder is installed. The flaps may include a grip pad secured to the flap thicker end for providing adhesion between the flap and the surface opening whereby the locking ring is prevented from rotating when the insert is rotated and allowing the flaps to engage the surface opening when the cup holder is installed. The outer sleeve may include a groove for securing the locking ring around the outer sleeve. The outer sleeve may include an outwardly extending flange along an upper edge of the cylindrical wall for controlling the depth when the outer sleeve is installed in the surface opening. The self-locking ring may include a trim ring engagable with the outer sleeve flange, the trim ring visually covering the outer sleeve flange after installation. The outer sleeve may include a groove for securing the locking ring around the outer sleeve. The outer sleeve may include a tapered protrusion extending around the outer sleeve below the groove for allowing the locking ring plastically deform and slide over the tapered protrusion, securing the locking ring in the groove whereby the locking ring is rotatable in the groove.

Another aspect of the invention is directed to a method for installing a self-locking cup holder in a surface opening. The method includes providing a self-locking cup holder including an outer sleeve having a cylindrical wall, a plurality of horizontally elongated openings, each elongated opening extending around an upper portion of the outer sleeve cylindrical wall and a plurality of support members disposed between the elongated opening and a locking ring including a cylindrical wall and a plurality of hinged horizontal flaps disposable in the elongated openings, the hinged flaps having a larger thickness at a second end tapering to a smaller thickness at a first flap end attached to the locking ring cylindrical wall, the locking ring rotatingly engagable on an upper portion of the outer sleeve, the hinged flaps movable from a first inward position toward an interior of the outer sleeve to a second outward position contacting an edge of the surface opening. Rotation of the outer sleeve in relation to the locking ring urges the plurality of members toward the thicker end of the hinged flaps, forcing the hinged flaps outwardly against the surface opening when the cup holder is disposed in the opening and secures the cup holder in the opening. The method includes ensuring the locking ring is engaged with the outer sleeve, inserting the outer sleeve in the surface opening and rotating the outer sleeve in relation to the locking ring wherein during rotation of the outer sleeve, the outer sleeve support members slide along the locking ring horizontal flaps, urging the locking ring horizontal flaps against the surface opening and securing the self-locking cup holder in the surface opening. The method may include providing a cup holder insert having an insert cylindrical wall and a flange extending outwardly from an upper rim of the cup holder insert, the cup holder insert engagable with the outer sleeve and include the step of inserting the cup holder insert into the outer sleeve before the step of inserting the outer sleeve in the surface opening. The method may include providing a cup holder insert having an insert cylindrical wall and a flange extending outwardly from an upper rim of the cup holder insert, the cup holder insert engagable with the outer sleeve and include the step of inserting the cup holder insert into the outer sleeve before the step of rotating the outer sleeve in relation to the locking ring. The method may include the self-locking cup having an integrated electrical connector for powering electrical devices within or adjacent the cup holder insert and may including the step of connecting a power source to the integrated electrical connector before the step of inserting the outer sleeve in the surface opening. The self-locking cup holder may include an integrated electrical connector for powering electrical devices within or adjacent the cup holder insert and the method may include the step of connecting a power source to the integrated electrical connector after the step of rotating the outer sleeve in relation to the locking ring.

Another aspect of the invention is directed to a self-locking cup holder securable in an opening in a surface comprising an outer sleeve having a cylindrical wall, a plurality of horizontally elongated openings, each elongated opening extending around an upper portion of the outer sleeve cylindrical wall and a plurality of support members disposed between the elongated opening. The cup holder includes a locking ring having a cylindrical wall and a plurality of hinged horizontal flaps disposable in the elongated opening, the hinged flaps having a larger thickness at a second end tapering to a smaller thickness at a first flap end attached to the locking ring cylindrical wall, the locking ring rotatingly engagable on an exterior upper portion of the outer sleeve, the hinged flaps including outwardly extending protrusions for engaging the surface opening when the cup holder is installed and movable from a first position toward the cup holder insert to a second position adjacent the surface opening and the outer sleeve including a groove for securing the locking ring around the outer sleeve. The cup holder insert has an insert cylindrical wall and a flange extending outwardly from an upper rim of the cup holder insert, the cup holder insert engagable with the outer sleeve. Rotation of the outer sleeve in relation to the locking ring urges the plurality of members toward the thicker end of the hinged flaps, forcing the hinged flaps outwardly against the surface opening when the cup holder is disposed in the opening and secures the cup holder in the opening.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment of the present invention, reference will be made herein to FIGS. 1-11 of the drawings in which like numerals refer to like features of the invention.

Figure 1:
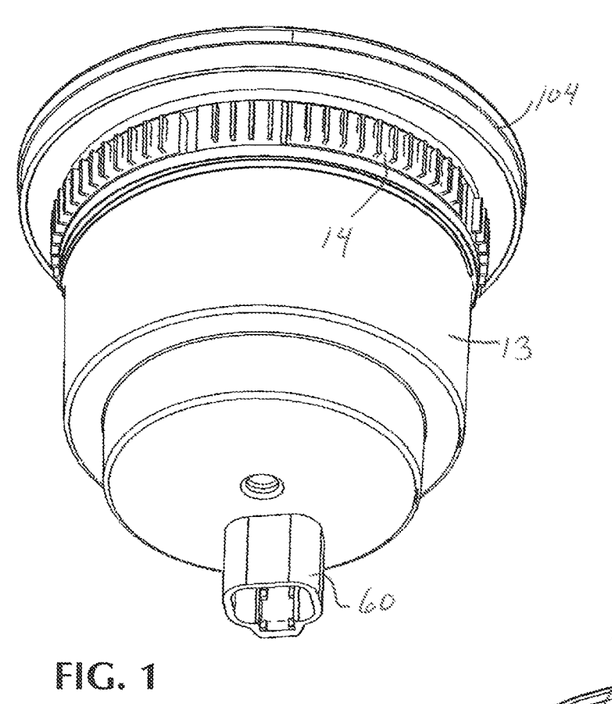
FIG. 1 is a front bottom perspective view of the cup holder according to the present invention.
Figure 2:
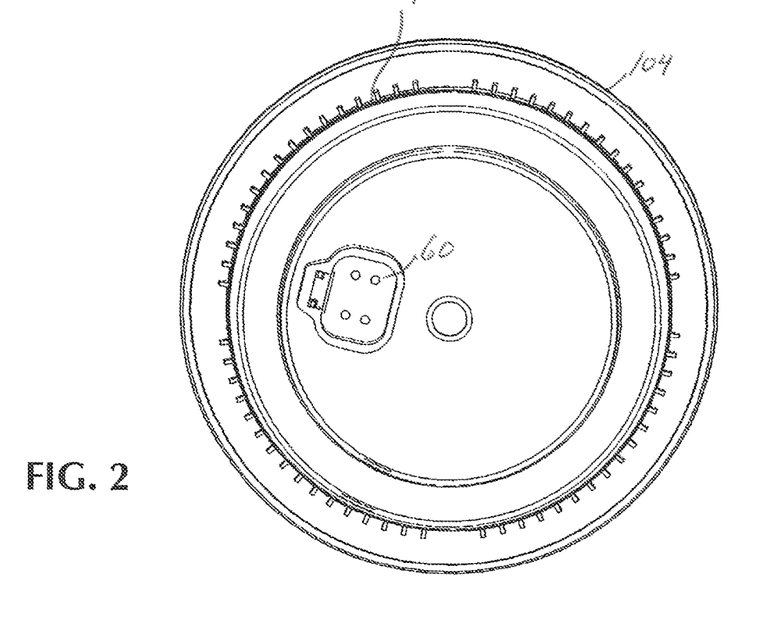
FIG. 2 is a bottom plan view of the cup holder shown in FIG. 1.
Figure 3:
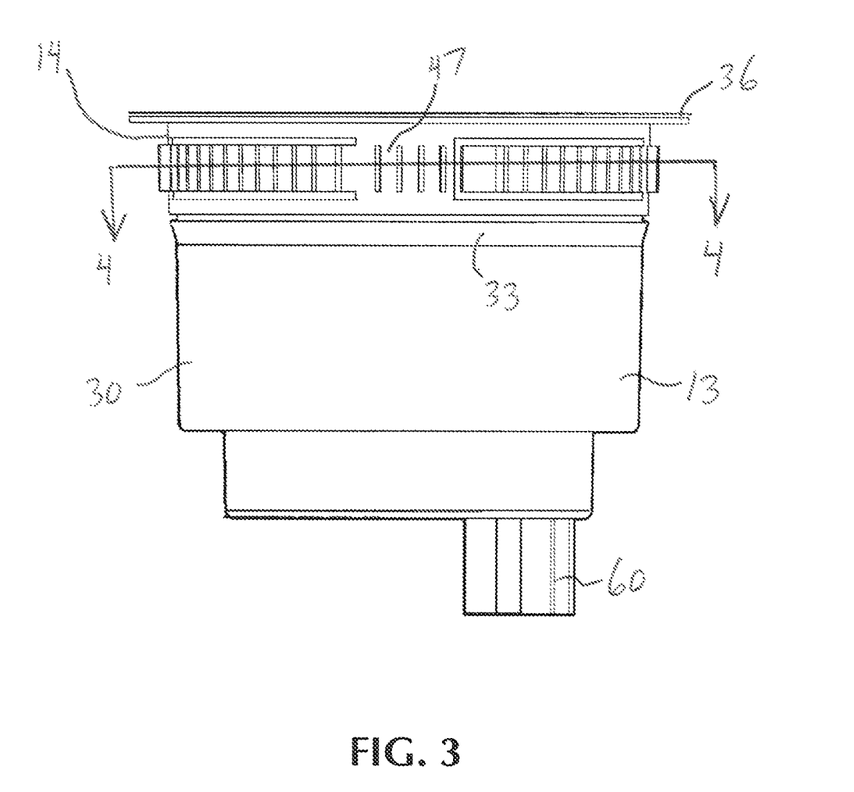
FIG. 3 is a side view of the cup holder shown in FIG. 1.

The self-locking cup holder 10 is shown in a bottom side perspective view of FIG. 1, a bottom plan view of FIG. 2 and a side elevational view of FIG. 3. The self-locking cup holder includes an outer sleeve 13 and a locking ring 14. The cup holder insert is not visible in FIGS. 1-3 but can be seen in the exploded views of FIGS. 6-8. The outer sleeve 13 includes a cylindrical wall 30. A plurality of horizontally elongated openings 32 include opposing opening ends 32*a*, 32*b*, each elongated opening 32 extending around an upper portion of the outer sleeve cylindrical wall 30. A cylindrical rim 37 disposed above the elongated openings 32 and a plurality of support columns or support members 35 extend horizontally between the elongated openings 32 and extend vertically between the cylindrical wall 30 and the cylindrical rim 37. The outer sleeve 13 includes a sleeve flange 36 extending outwardly from the sleeve rim 37. The outer sleeve 13 includes a tapered protrusion 33 extending around the outer sleeve below the elongated openings 32, forming a circumferential groove 39 between the tapered protrusion and the sleeve flange 36. The groove 39 receives a locking ring 14 for rotation about the groove 39. The protrusion 33 is plastically deformable allowing the locking ring 14 to slide over the tapered protrusion 33 during assembly and secures the locking ring 14 in the groove 39 whereby the locking ring 14 is rotatable in the groove 39.

The locking ring 14 includes a cylindrical ring wall 41 rotatingly engaging the outer sleeve groove 39 on the outer sleeve 13 adjacent the elongated openings 32 and support members 35. A plurality of hinged horizontal flaps 42 are substantially fully disposed in the elongated openings 32 when the self-locking cup holder 10 is in the unsecured position in the opening 102 of a surface 10, preferably the horizontal surface in an RV or marine vessel. The hinged flaps 42 have a larger thickness at a second flap end 42b tapering to a first flap end 42a having a smaller thickness. The first flap end 42a is flexibly attached to a fixed support 47 extending between the ring wall 41 and an upper ring wall portion 77. The second flap end 42b is movable from a first inward position toward an interior of the outer sleeve 13 whereby the self-locking cup holder 10 is loose in the surface opening 102 to a second outward position contacting an edge of the surface opening 102 whereby the self-locking cup holder 10 is secured in the surface opening 102. A ring flange 47 extends outwardly from the upper ring wall portion 77. Rotation of the outer sleeve 13 in relation to the locking ring 14 urges the plurality of support members 35 toward the thicker end 42b of the hinged flaps 42, forcing the hinged flap thicker end 42b from the first position to the second position against the surface opening 102 when the cup holder is disposed in the opening 102, securing the self-locking cup holder 10 in the opening 102. The flaps 42 may include a grip pad 31 secured to the flap thicker end 42b for providing adhesion between the flap 42 and the surface opening 102. The locking ring 14 is thereby prevented from rotating when the insert 12 or outer sleeve 13 is rotated, allowing the flaps 42 to engage the surface opening 102 when the cup holder is installed A self-locking cup holder 10 includes a cup holder insert 12, an outer sleeve 13 and a locking ring 14. The cup holder insert 12 includes a cylindrical wall 20, a pair of parallel elongated protrusions 28 and a fixed cup holder insert flange or a removable flange or trim ring 104 extending outwardly from the upper rim 26 of the cylindrical wall 20. The locking ring 14 includes a locking ring cylindrical wall 40, a flange 46 extending from an upper rim of the locking ring cylindrical wall 40 and a plurality of hinged flaps 42 integral at a first flap end 42a to the cylindrical wall 40 and movable at a second end 42b relative to the cylindrical wall. The hinged flaps have a larger thickness at the second end 42b tapering to a smaller thickness at the first flap end 42a. The hinged flaps 42 include a plurality of outwardly extending protrusions or parallel vertical ridges 44.

Figure 4:
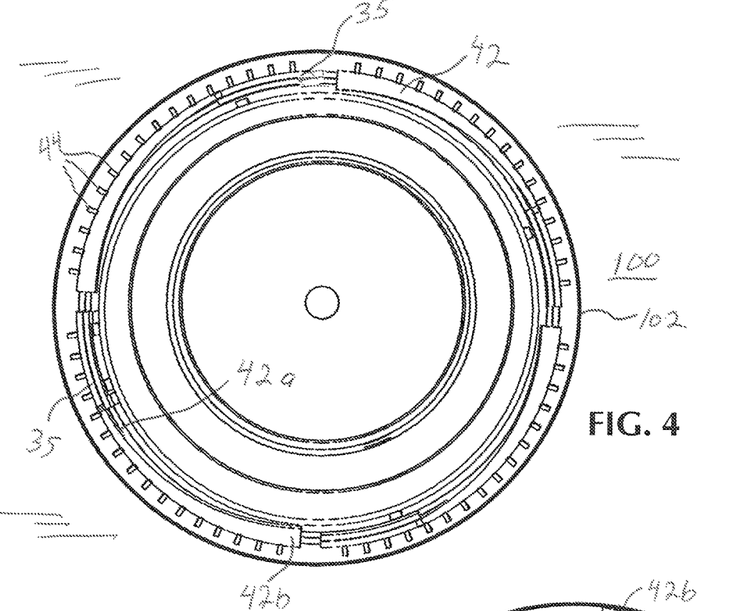
FIG. 4 is a cross sectional view of the cup holder across cut lines 4-4 of the cup holder shown in FIG. 3 loosely fitted in a surface opening.
Figure 5:
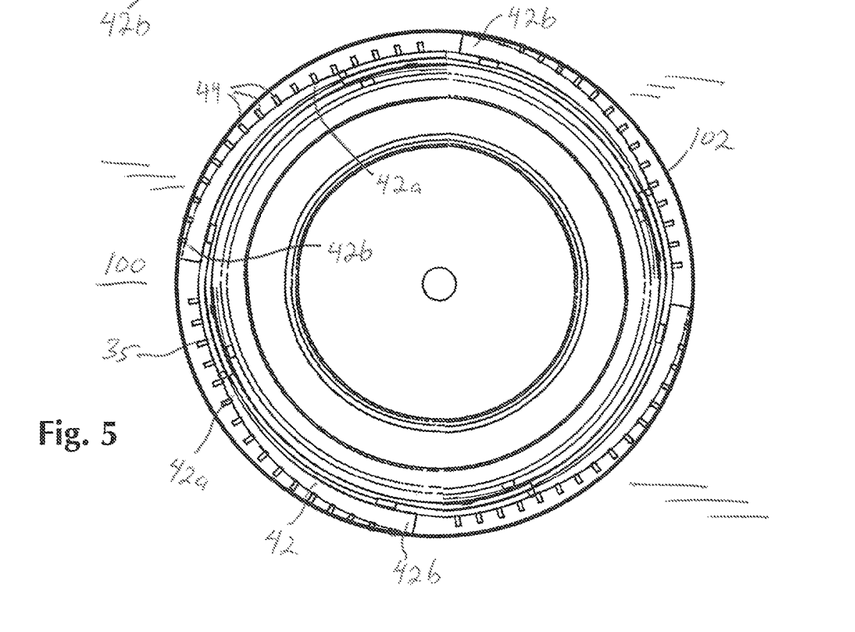
FIG. 5 is a cross sectional view of the cup holder across cut lines 4-4 of the cup holder shown in FIG. 3 fully secured in a surface opening.

FIGS. 4 and 5 show a cutaway view of the cup holder in the direction of the cut lines 4-4 in FIG. 3. The cup holder is shown within a surface opening 102 or a boat surface 100. FIG. 4 shows the cup holder 10 of FIG. 3 with the cup holder insert 12 and outer sleeve 13 rotated in the counter clockwise direction so that the support member 35 slides along the hinged flap 42, urging the thicker end 42b against the surface opening 102 until the vertical ridges 44 are plastically deformed against the surface opening, securing the cup holder in the opening. The tapered protrusion 33 holds the outer sleeve 13 vertically against the locking ring and from moving in an upwardly direction. The outer sleeve flange 36 holds the outer sleeve 13 vertically against the locking ring and from moving in a downwardly direction. The locking ring 14 is urged into the position shown in FIG. 5 by rotating the cup holder insert 12 in a counter clockwise direction looking down at the cup holder insert 12. The rotating motion engages the elongated protrusions 28 extending radially outward from the outside surface of the cup holder insert cylindrical wall 20 with the inwardly elongated protrusions 38 extending radially inward from the inside surface of the outer sleeve 13, forcing the support members 35 to slide against the corresponding hinged flap 42 toward the thicker end 42b of the hinged flap 42 urging the thicker end 42b against the surface opening 102 until the vertical ridges 44 are plastically deformed against the surface opening, securing the cup holder in the opening.

Figure 7:
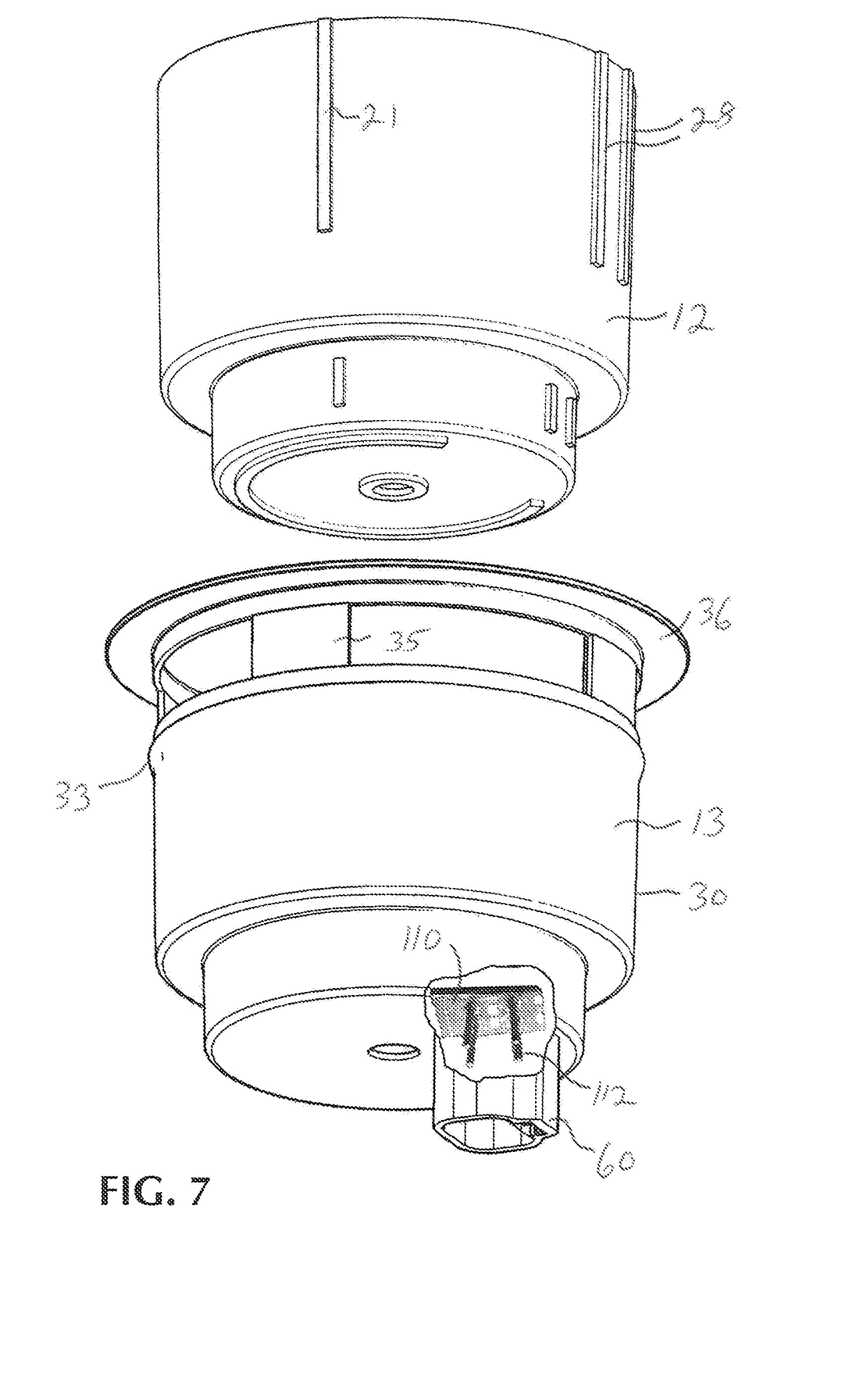
FIG. 7 is an exploded bottom side perspective view of the outer sleeve and cup holder insert according to the present invention.
Figure 8:
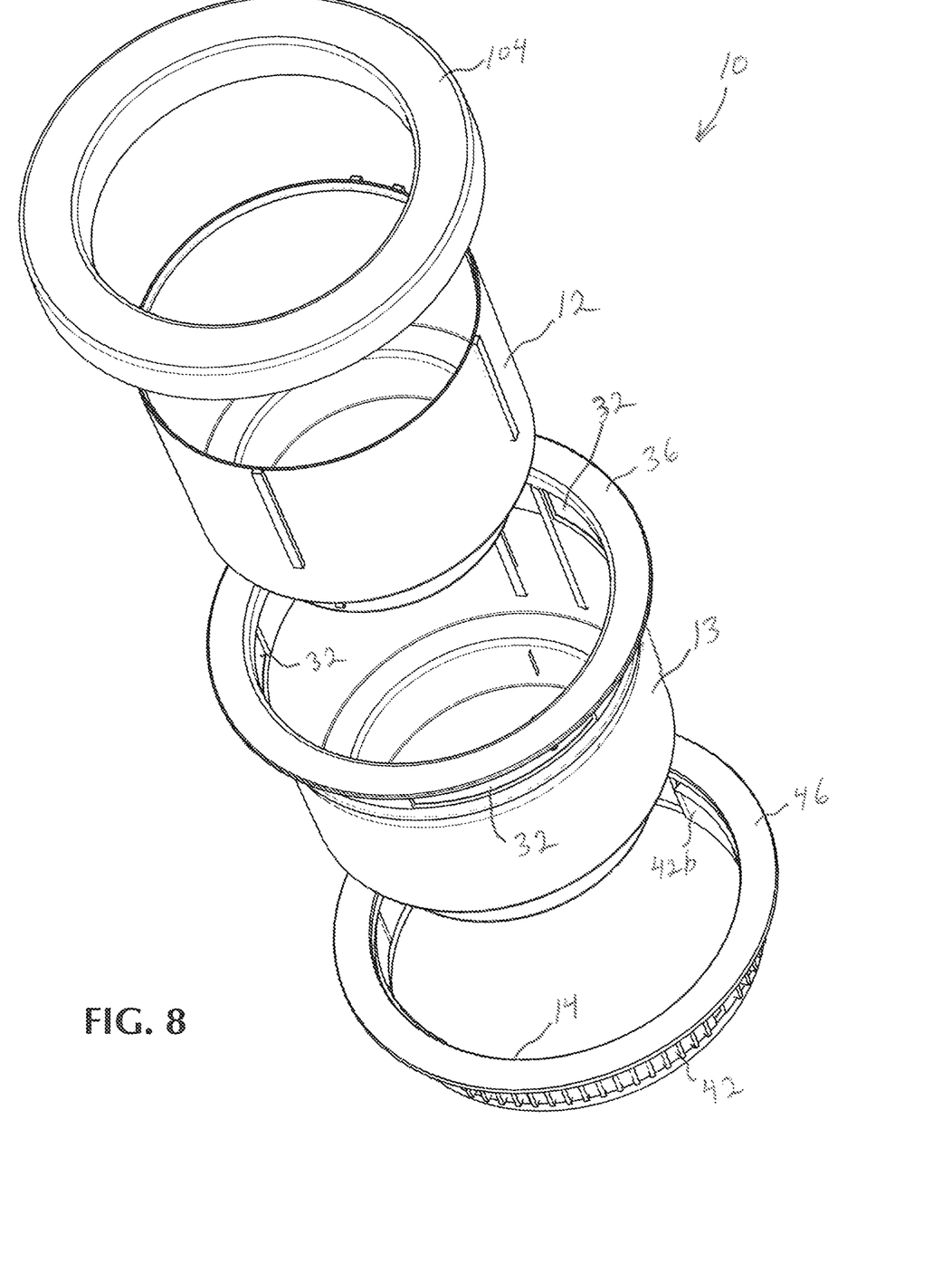
FIG. 8 is an exploded top front perspective view of the self-locking cup holder according to the present invention.
Figure 9:
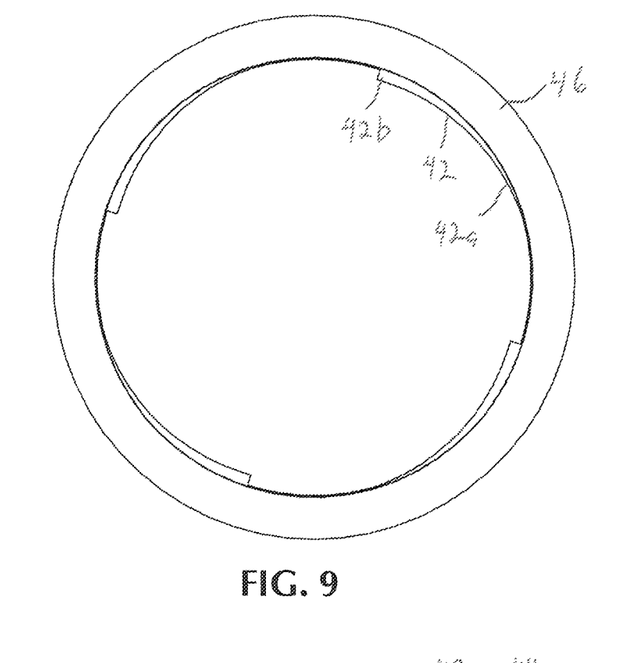
FIG. 9 is a top plan view of the locking ring according to the present invention.
Figure 10:
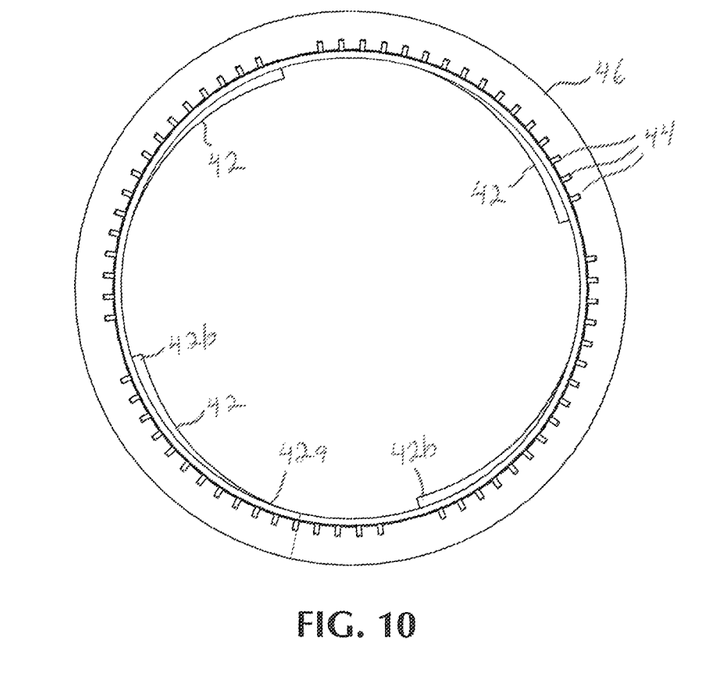
FIG. 10 is a bottom plan view of the locking ring according to the present invention.
Figure 11:
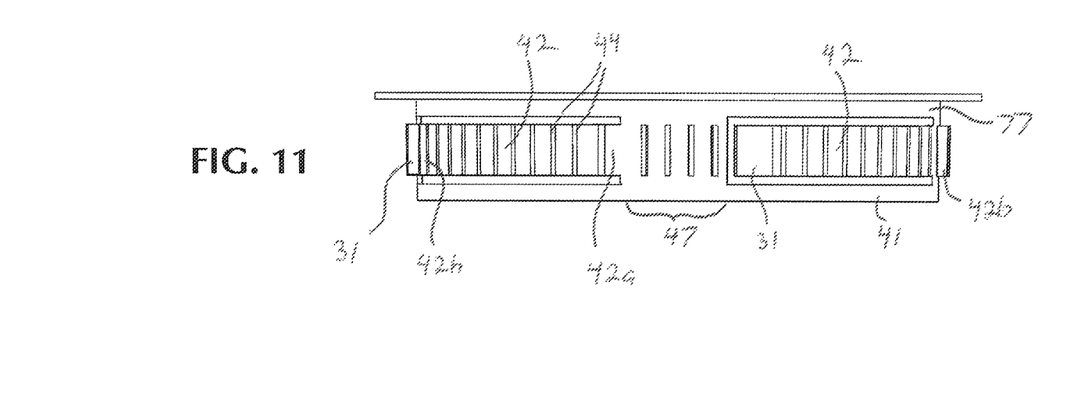
FIG. 11 is a side elevational view of the locking ring according to the present invention.

FIG. 7 shows a lighted circuit board 110 which may have pins 112 which protrude into a connector opening 60 at the lower portion of the outer sleeve 13. The lighted circuit board 110 may provide illumination through a transparent or translucent outer sleeve 13. The pins 112 may alternately be connected to LED components in other portions of the self-locking cup holder 10 (i.e. between the outer sleeve 13 and cup holder insert 12 or under the trim ring 104). The trim ring 104 may be engagable with the outer sleeve flange 36 if the cup holder insert does not have a flange or with the cup holder insert flange 26 as shown in FIG. 3. FIG. 9 shows an exploded view of the self-locking cup holder 10 with the trim ring 104 engagable with the outer sleeve flange 36.

The device does not require mechanical fasteners and provides for a quick and easy installation. The cup holder insert 12, outer sleeve 13 and locking ring 14 may be manufactured from a plastic, acrylic, metal or any other material which provides sufficient flexibility for securing the cup holder in place. The cup holder insert 12, outer sleeve 13 and locking ring 14 may be of any color material. Gaskets may be included to provide a water-resistant installation. Each of the cup holder insert 12, outer sleeve 13 and locking ring 14 may be made of different materials or different colors so that material characteristics may be taken advantage of for each component.

Figure 6:
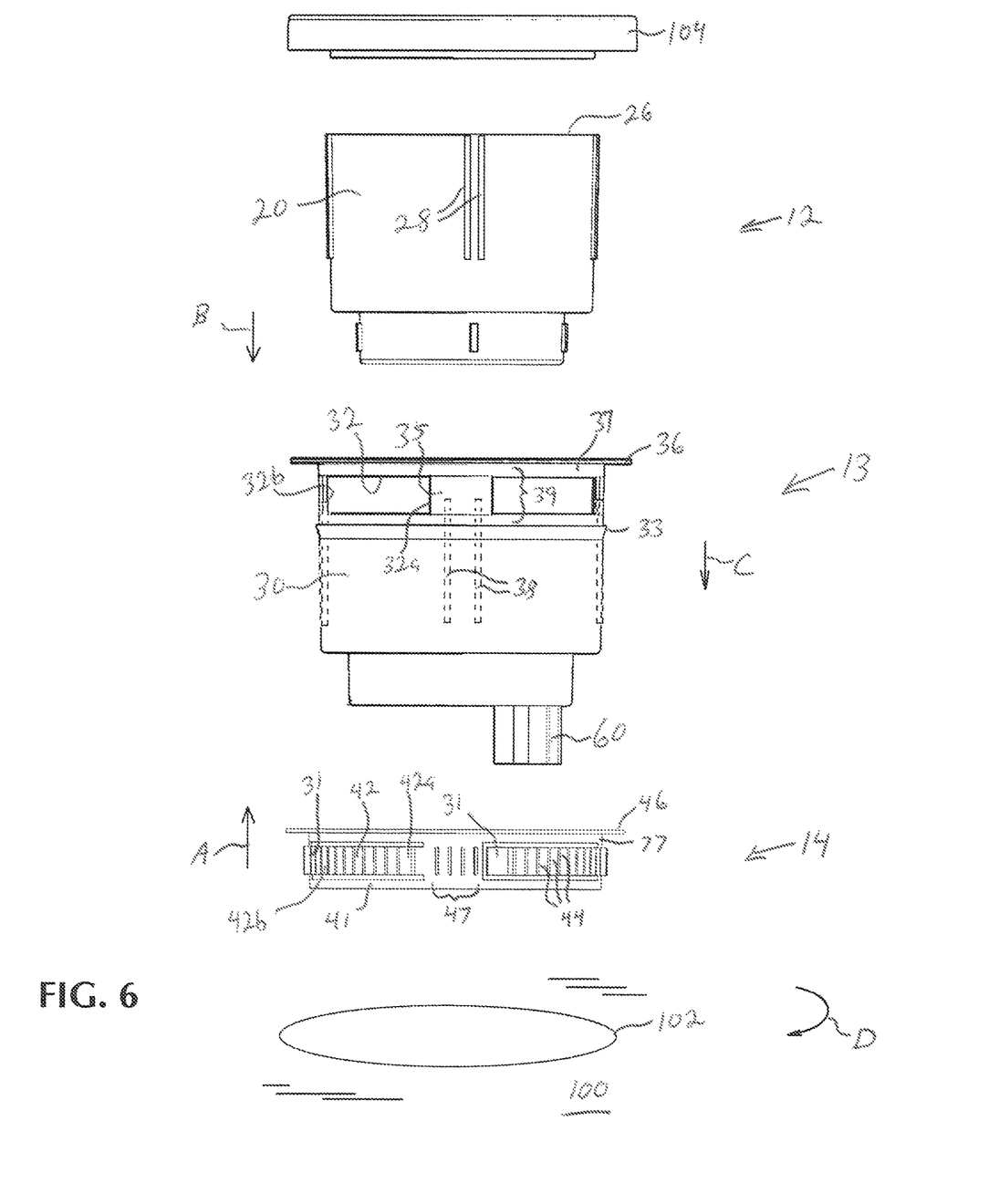
FIG. 6 is an exploded side elevational view of the cup holder showing the method of installation in a surface opening according to the present invention.

In a method of installing the self-locking cup holder as shown in FIG. 6, the locking ring 14 is pushed in the direction of arrow A up along the cylindrical wall 30 of outer sleeve 13 until the locking ring 14 deforms the tapered protrusion 33 of the outer sleeve 13 and the bottom rim of the locking ring 14 engages the tapered protrusion 33 as it snaps into place, securing the locking ring 14 into the groove 39 between the outer sleeve flange 36 and the tapered protrusion 33 wherein the locking ring flange 46 is positioned adjacent the bottom of outer sleeve flange 36. The locking ring may be rotated in either direction until the hinged flaps 42 are within the corresponding elongated openings 32 so the thicker end 42b of the hinged flap 42 is adjacent the vertical portion 32b of opening 32. The thicker end 42b of the hinged flap 42 may be pushed in the opening 32 so that the locking ring 14 can be inserted into the opening 102 of the boat surface 100. The cup holder insert 12 may be inserted into the outer sleeve 13 in the direction of arrow B before or after the outer jacket 13 and locking ring 14 are placed in the boat surface opening 102 in the direction of arrow C. The outer sleeve 13 or the insert 12 may then be rotated in the direction of arrow D, sliding support member 35 along the inside surface of flap 42 toward flap end 42b until the flap 42 applies sufficient pressure on the surface opening 102 to secure the self-locking cup holder 10 in the surface opening 102.

Another method of installation includes ensuring the locking ring 14 is engaged with the outer sleeve 13 and inserting the outer sleeve 13 in the surface opening 102. The method includes rotating the outer sleeve 13 in relation to the locking ring 14 wherein during rotation of the outer sleeve 13, the outer sleeve support members 35 slide along the locking ring horizontal flaps 42, urging the locking ring horizontal flaps 42 against the surface opening 102 and securing the self-locking cup holder 10 in the surface opening 102.

The invention as described above has been shown to be a cup holder which locks into a surface opening without the use of tools and to provide a self-locking cup holder which is secure when installed in a surface opening. The invention has been shown to be a self-locking cup holder which may be quickly installed in a surface opening. The invention as described provides a method for installing the self-locking cup holder.

While the present invention has been particularly described, in conjunction with a specific embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A self-locking cup holder securable in an opening in a surface comprising:
   an outer sleeve having a cylindrical wall, a plurality of horizontally elongated openings, each elongated opening extending around an upper portion of the outer sleeve cylindrical wall, a cylindrical rim disposed above the elongated openings and a plurality of support members extending horizontally between the elongated openings and extending vertically between the cylindrical wall and the cylindrical rim; and
   a locking ring including a cylindrical ring wall rotatingly engaging the outer sleeve on an outer surface of the outer sleeve adjacent the elongated openings and support members, and a plurality of hinged horizontal flaps disposable in the elongated openings, the hinged flaps having a larger thickness at a second end tapering to a smaller thickness at a first flap end attached to the locking ring cylindrical wall, the hinged flaps movable from a first inward position toward an interior of the outer sleeve to a second outward position contacting an edge of the surface opening;
   wherein rotation of the outer sleeve in relation to the locking ring urges the plurality of support members toward the thicker end of the hinged flaps, forcing the hinged flaps from the first position to the second position against the surface opening when the cup holder is disposed in the opening, securing the cup holder in the opening.

2. The self-locking cup holder of claim 1 including a cup holder insert having an insert cylindrical wall and a flange extending outwardly from an upper rim of the cup holder insert, the cup holder insert engagable with the outer sleeve.

3. The self-locking ring of claim 2 wherein the cup holder outer sleeve includes an outer sleeve flange extending radially outward from the outer sleeve cylindrical rim and the insert flange is engagable over the outer sleeve flange.

4. A method for installing a self-locking cup holder in a surface opening comprising:
   providing a self-locking cup holder including an outer sleeve having a cylindrical wall, a plurality of horizontally elongated openings, each elongated opening extending around an upper portion of the outer sleeve cylindrical wall and a plurality of support members disposed between the elongated opening and a locking ring including a cylindrical wall and a plurality of hinged horizontal flaps disposable in the elongated openings, the hinged flaps having a larger thickness at a second end tapering to a smaller thickness at a first flap end attached to the locking ring cylindrical wall, the locking ring rotatingly engagable on an upper portion of the outer sleeve, the hinged flaps movable from a first position toward the cup holder insert to a second position adjacent the surface opening, wherein rotation of the outer sleeve in relation to the locking ring urges the plurality of support members toward the thicker end of the hinged flaps, forcing the hinged flaps outwardly against the surface opening when the cup holder is disposed in the opening and secures the cup holder in the opening;
   ensuring the locking ring is engaged with the outer sleeve;
   inserting the outer sleeve in the surface opening; and
   rotating the outer sleeve in relation to the locking ring wherein during rotation of the outer sleeve, the outer sleeve support members slide along the locking ring horizontal flaps, urging the locking ring horizontal flaps against the surface opening and securing the self-locking cup holder in the surface opening.

5. The method of claim 4 wherein the self-locking cup holder includes a cup holder insert having an insert cylindrical wall and a flange extending outwardly from an upper rim of the cup holder insert, the cup holder insert engagable with the outer sleeve and including the step of inserting the cup holder insert into the outer sleeve before the step of inserting the outer sleeve in the surface opening.

6. The method of claim 4 wherein the self-locking cup holder includes a cup holder insert having an insert cylindrical wall and a flange extending outwardly from an upper rim of the cup holder insert, the cup holder insert engagable with the outer sleeve and including the step of inserting the cup holder insert into the outer sleeve before the step of rotating the outer sleeve in relation to the locking ring.

7. The method of claim 4 wherein the self-locking cup holder includes an integrated electrical connector for powering electrical devices within or adjacent the cup holder insert, and including the step of connecting a power source to the integrated electrical connector before the step of inserting the outer sleeve in the surface opening.

8. The method of claim 4 wherein the self-locking cup holder includes an integrated electrical connector for powering electrical devices within or adjacent the cup holder insert and including the step of connecting a power source to the integrated electrical connector after the step of rotating the outer sleeve in relation to the locking ring.

9. A self-locking cup holder securable in an opening in a surface comprising:
   an outer sleeve having a cylindrical wall, a plurality of horizontally elongated openings, each elongated opening extending around an upper portion of the outer sleeve cylindrical wall and a plurality of support members disposed between the elongated opening;
   a locking ring including a cylindrical wall and a plurality of hinged horizontal flaps disposable in the elongated openings, the hinged flaps having a larger thickness at a second end tapering to a smaller thickness at a first flap end attached to the locking ring cylindrical wall, the locking ring rotatingly engagable on an exterior upper portion of the outer sleeve, the hinged flaps including outwardly extending protrusions for engaging the surface opening when the cup holder is installed and movable from a first position toward the cup holder insert to a second position adjacent the surface opening and the outer sleeve including a groove for securing the locking ring around the outer sleeve;

a cup holder insert having an insert cylindrical wall and a flange extending outwardly from an upper rim of the cup holder insert, the cup holder insert engagable with the outer sleeve;

wherein rotation of the outer sleeve in relation to the locking ring urges the plurality of support members toward the thicker end of the hinged flaps, forcing the hinged flaps outwardly against the surface opening when the cup holder is disposed in the opening and secures the cup holder in the opening.

10. The self-locking cup of claim 9 including an integrated electrical connector for powering electrical devices within or adjacent the cup holder insert.

11. The self-locking ring of claim 9 wherein the flaps include vertical ridges for engaging the surface opening when the cup holder is installed.

12. The self-locking ring of claim 9 wherein the flaps include a grip pad secured to the flap thicker end for providing adhesion between the flap and the surface opening whereby the locking ring is prevented from rotating when the insert is rotated and allowing the flaps to engage the surface opening when the cup holder is installed.

13. The self-locking ring of claim 9 wherein the outer sleeve includes an outwardly extending flange along an upper edge of the cylindrical wall for controlling the depth when the outer sleeve is installed in the surface opening.

14. The self-locking cup holder of claim 13 wherein the cup holder insert includes a plurality of elongated holder protrusions extending radially outward from the outside surface of the cup holder insert cylindrical wall and the outer sleeve includes a plurality of elongated sleeve protrusions extending radially inward from the inside surface of the outer sleeve engagable with the elongated holder protrusions wherein rotation of the outer sleeve forces the support members to slide against the corresponding hinged flap toward the thicker end of the hinged flap urging the thicker end against the surface opening until a plurality of vertical ridges disposed on the hinged flap are plastically deformed against the surface opening, securing the cup holder in the opening.

15. The self-locking ring of claim 9 wherein the flaps include outwardly extending protrusions for engaging the surface opening when the cup holder is installed.

16. The self-locking cup holder of claim 9 wherein the outer sleeve includes a groove for securing the locking ring around the outer sleeve.

17. The self-locking cup holder of claim 16 wherein the outer sleeve includes a tapered protrusion extending around the outer sleeve below the groove for allowing the locking ring plastically deform and slide over the tapered protrusion, securing the locking ring in the groove whereby the locking ring is rotatable in the groove.

18. The self-locking cup holder of claim 17 including a trim ring engagable with the outer sleeve flange, the trim ring visually covering the outer sleeve flange after installation.

\* \* \* \* \*